Nov. 13, 1928.

B. POLISENA ET AL 1,691,855

TIRE TOOL

Filed March 30, 1928　　2 Sheets-Sheet 1

Fig. 4ᴬ.

INVENTORS
B. Polisena
BY H. Campedel.
Bryant & Lowry
ATTORNEYS

Nov. 13, 1928.                                                    1,691,855
B. POLISENA ET AL
TIRE TOOL
Filed March 30, 1928          2 Sheets-Sheet 2

INVENTORS
B. Polisena
BY H. Campedel.
Bryant & Lowry
ATTORNEYS

Patented Nov. 13, 1928.

1,691,855

UNITED STATES PATENT OFFICE.

BERNARDO POLISENA AND HENRY CAMPEDEL, OF NEW YORK, N. Y.

TIRE TOOL.

Application filed March 30, 1928. Serial No. 265,940.

This invention relates to certain new and useful improvements in tire tools and has particular reference to the type of tool employed for collapsing and expanding a metallic split rim for the purpose of removing and mounting a tire shoe thereon.

The primary object of the invention is to provide a tire tool in which a plurality of radial arms having rim engaging jaws at their outer ends with means associated with the inner ends of the arms and being manually operable for collapsing and expanding a split rim.

With the above and other objects in view that will become apparent as the nature of the invention is better understood, the same consists in the novel form, combination and arrangement of parts hereinafter more fully described, shown in the accompanying drawings and claimed.

In the accompanying drawings, wherein like reference characters indicate corresponding parts throughout the several views, Figure 1 is a side elevational view of a tire tool constructed in accordance with the present invention, the same being illustrated as engaged with the split rim that carries a tire;

Figure 4:
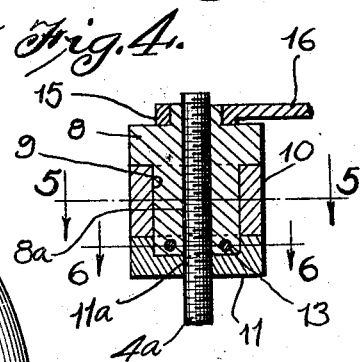
Figure 4 is a detail sectional view taken on line 4—4 of Figure 1.
Figures 5, 6:
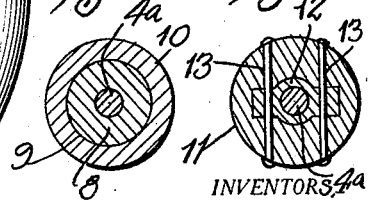
Figure 7:
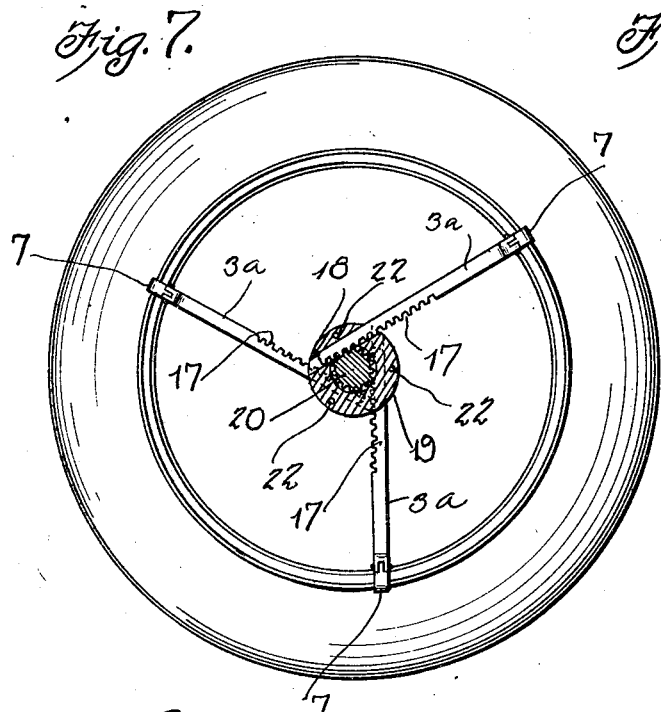
Figure 9:
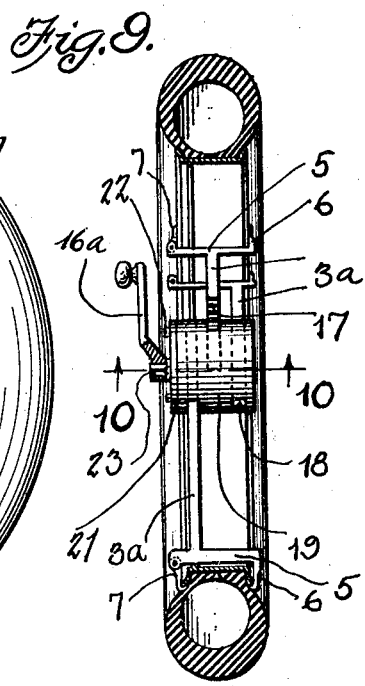
Figure 8:
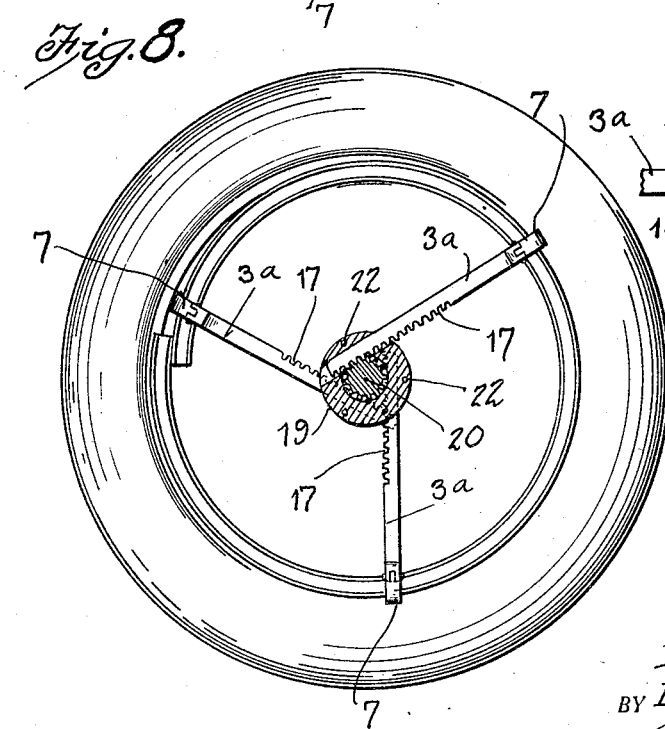
Figure 10:
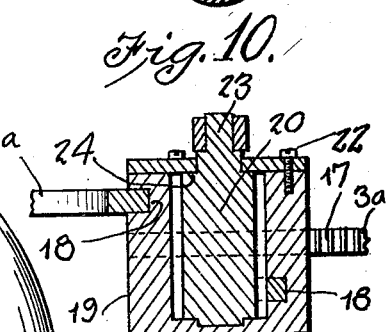

Figure 4$^a$ is a fragmentary perspective view of a part of the screw operating device;

Figure 5 is a detail sectional view taken on line 5—5 of Figure 4;

Figure 6 is a detail sectional view taken on line 6—6 of Figure 4;

Figures 7 and 8 show side elevational views, partly in section of another form of tire tool associated with a split wheel rim and tire;

Figure 9 is a vertical cross-sectional view of the tire and tool shown in Figures 7 and 8;

Figure 10 is a detail sectional view taken on line 10—10 of Figure 9; and

Figure 11:
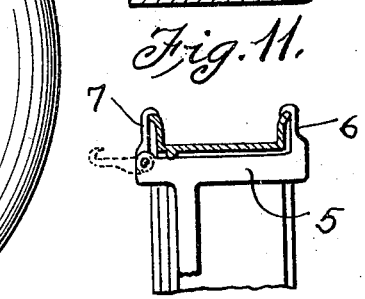

Figure 11 is a detail sectional view, partly in elevation of a part of the rim and tool showing the construction of one of the rim engaging arm heads.

In both forms of the invention disclosed herein, the main idea is to provide a tire or rim tool having three radial arms with a rim engaging head or jaw at the outer end of each arm and with means associated with the inner ends of the arms to cause movement thereof for the collapsing or contraction and expansion of a split rim. In the preferred form of the invention as shown in Figures 1 to 6, the tool is associated with a split rim 1 that carries the tire shoe 2 and said tool comprises three radial arms, two of which are designated by the reference numeral 3, while the third arm is designated by the reference numeral 4. The rim engaging head or jaw is carried by the outer end of the arms 3 and 4 and being more clearly shown in Figure 11, the same comprises a cross-head 5 having a rigid rim engaging flange 6 on one end and a pivoted rim engaging flange 7 upon its other end, for detachable engagement with the side flanges of the wheel rim 1.

The operating means for the arms 3 and 4 comprises a cylindrical block 8 that has a reduced annular neck 9 for the rotatable reception of the collar 10, the collar being retained in position on the reduced neck 9 by the bottom disk 11 that has an inter-locking connection 12 at the lower end of the block 8 and further secured thereto by the cross pins 13. The block 8 and disk 11 are provided with alined internally threaded bores 8$^a$ and 11$^a$ respectively through which the threaded portion 4$^a$ of the radial arm 4 extends. The inner ends of the arms 3 are pivotally connected as at 14 to the collar 10 to permit equidistant engagement between the rim engaging jaws and the rim.

Figure 1:
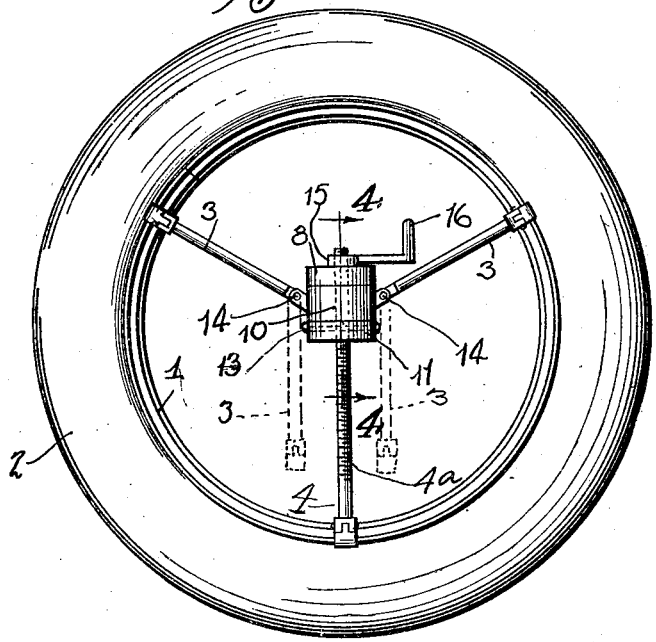
Figure 3:
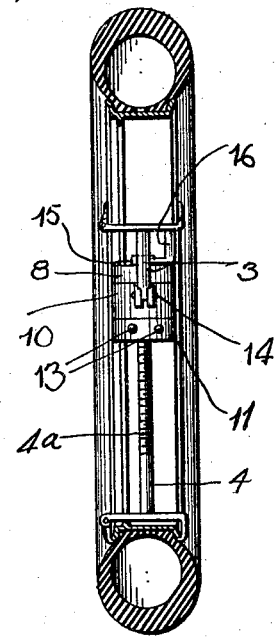
Figure 3 is a vertical cross-sectional view through the assembled tire, rim and tool.
Figure 2:
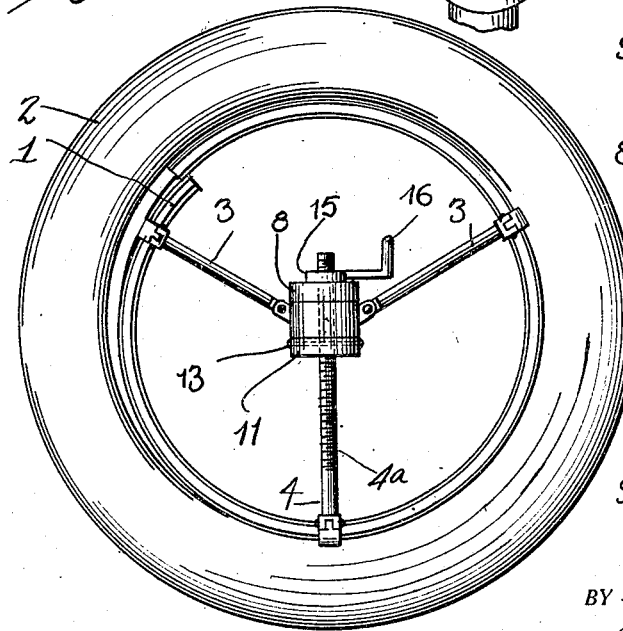
Figure 2 is a similar side elevational view showing the tool operated for contracting or collapsing the split rim.

As shown in Figures 1, 2 and 4, the upper face of the block 8 is shouldered to form a polygonal nut 15 that surrounds the opening 8$^a$ to receive the similarly apertured end of the crank handle 16.

When the tool is engaged with said rim as shown in Figure 1, the crank handle 16 is engaged with the block 8 and upon rotating the crank handle, the block 8 and bottom disk 11 are rotated upon the threaded portion 4$^a$ of the arm 4 for lowering the blocks or moving the same toward the outer end of the arm. The block 8 is rotatable in the collar 10 that is held against rotation by having the arms 3 thereof engaged with the split rim 1, and this movement of the block and collar causes collapsing of the split rim and separation of the split end thereof.

The split ends of the rim are expanded into mating relation when the block 8 is reversely rotated upon the threads 4ª of the arm 4.

In the form of the invention shown in Figures 7 to 11, the radial arms 3ª, that have the rim engaging jaws 5 at their outer ends, are provided with rack teeth 17. The inner ends of the arm 3ª pass through openings 18 at different elevations in the casing 19. The casing 19 incloses a ribbed cylinder 20 with which the rack teeth 17 of the arms 3ª are engageable, the ribbed cylinder being retained in the casing 18 by the cap plate 21 that is secured as at 22 to the upper end of the casing and having a central opening therein for the passage of the key end 23 of the cylinder and for engagement with the shoulders 24 on the upper end of the cylinder. The crank handle 16ª is engageable with the upper key end 23 of the ribbed cylinder 24 and when the latter is rotated in the desired direction, the radial arms 3ª are longitudinally shifted.

While there are herein shown and described the preferred embodiments of the present invention, it is nevertheless to be understood that minor changes may be made therein without departing from the spirit and scope of the invention as claimed.

What I claim as new is:—

1. In a tire tool, a plurality of radial arms having rim engaging heads at their outer ends, one of said arms being threaded, a block threaded thereon, having a reduced annular neck, a collar rotatable on the reduced neck, a bottom plate threaded on the arm and having a key-shaped recess in its upper face, a key-shaped extension on the lower end of the block received in the recess cross-pins for locking the bottom plate to the block and retaining the collar in position, a pivotal connection between the collar and other arm, and means for rotating the block and plate.

2. In a tire tool, a plurality of radial arms having rim engaging heads at their outer ends, one of said arms being threaded, a block threaded thereon, having a reduced annular neck, a collar rotatable on the reduced neck, a bottom plate threaded on the arm and having a key-shaped recess in its upper face, a key-shaped extension on the lower end of the block received in the recess cross-pins for locking the bottom plate to the block and retaining the collar in position, a pivotal connection between the collar and other arm, a nut extension on the upper face of the block surrounding the arm bore and a crank engageable with the nut.

In testimony whereof we affix our signatures.

BERNARDO POLISENA.
HENRY CAMPEDEL.